(12) United States Patent
Verma et al.

(10) Patent No.: US 11,739,764 B2
(45) Date of Patent: Aug. 29, 2023

(54) REINFORCED VACUUM SYSTEM COMPONENT

(71) Applicant: Edwards Limited, Burgess Hill (GB)

(72) Inventors: Mayank Verma, Burgess Hill (GB); Richard Glyn Horler, Burgess Hill (GB)

(73) Assignee: Edwards Limited, Burgess Hill (GB)

( * ) Notice: Subject to any disclaimer, the term of this patent is extended or adjusted under 35 U.S.C. 154(b) by 12 days.

(21) Appl. No.: 16/968,985

(22) PCT Filed: Feb. 12, 2019

(86) PCT No.: PCT/GB2019/050365
§ 371 (c)(1),
(2) Date: Aug. 11, 2020

(87) PCT Pub. No.: WO2019/155235
PCT Pub. Date: Aug. 15, 2019

(65) Prior Publication Data
US 2021/0054852 A1 Feb. 25, 2021

(30) Foreign Application Priority Data
Feb. 12, 2018 (GB) .................... 1802245

(51) Int. Cl.
*F04D 29/32* (2006.01)
*F04D 19/04* (2006.01)
(Continued)

(52) U.S. Cl.
CPC ............ *F04D 29/324* (2013.01); *B33Y 80/00* (2014.12); *F04D 19/042* (2013.01); *F04D 29/023* (2013.01); *F04D 29/321* (2013.01)

(58) Field of Classification Search
None
See application file for complete search history.

(56) References Cited

U.S. PATENT DOCUMENTS 8,313,600 B2 * 11/2012 Wilson .................. G06F 3/0421
156/169
9,217,439 B2 * 12/2015 Kabasawa ............. F04D 19/044
(Continued)

FOREIGN PATENT DOCUMENTS

DE 202015004000 U1 9/2016
DE 202015004001 U1 9/2016
(Continued)

OTHER PUBLICATIONS

British Examination Report dated Jul. 24, 2018 and Search Report dated Jul. 23, 2018 for corresponding British Application No. GB1802245.9.
(Continued)

*Primary Examiner* — Kayla McCaffrey
(74) *Attorney, Agent, or Firm* — Theodore M. Magee; Westman, Champlin & Koehler, P.A.

(57) ABSTRACT

The invention provides a rotor assembly for a vacuum pump. The rotor assembly comprises a hub and one or more rotor blade arrays each comprising at least one rotor blade, each rotor blade extending from a rotor blade root contiguous with the hub to a rotor blade tip, wherein each rotor blade comprises a continuous fibre reinforced matrix material. The invention further provides methods of designing and manufacturing rotor blades, and vacuum systems comprising a component comprising a continuous fibre reinforced matrix material.

15 Claims, 2 Drawing Sheets

(51) Int. Cl.
  *F04D 29/02* (2006.01)
  *B33Y 80/00* (2015.01)

(56) References Cited

U.S. PATENT DOCUMENTS

| | | | |
|---|---|---|---|
| 2004/0076510 | A1 | 4/2004 | Favre-Felix et al. |
| 2016/0279885 | A1* | 9/2016 | Cantwell ................ B29C 70/36 |
| 2018/0100510 | A1* | 4/2018 | Hölzer ................... F04D 19/04 |
| 2021/0060851 | A1 | 3/2021 | Nakai et al. |

FOREIGN PATENT DOCUMENTS

| | | |
|---|---|---|
| DE | 202015004160 U1 | 9/2016 |
| EP | 1408237 A1 | 4/2004 |
| EP | 3085964 A1 | 10/2016 |
| JP | H1105795 | 7/1989 |
| JP | 2005180265 A | 7/2005 |
| JP | 2006046074 A | 2/2006 |
| WO | 2005001294 A1 | 1/2005 |
| WO | 2007015056 A1 | 2/2007 |
| WO | 2007068973 A1 | 6/2007 |
| WO | 2008035112 A1 | 3/2008 |
| WO | 2008129317 A1 | 10/2008 |
| WO | 2016180265 A1 | 11/2016 |
| WO | 2016198260 A1 | 12/2016 |

OTHER PUBLICATIONS

PCT Notification of Transmittal of the International Search Report and the Written Opinion of the International Searching Authority, or the Declaration dated May 14, 2019, PCT Search Report and Written Opinion dated May 14, 2019 for corresponding PCT Application No. PCT/GB2019/050365.

European Communication dated Nov. 2, 2022 for corresponding European application Serial No. 19707060.0, 6 pages.

Japanese Notification of Reason for Rejection dated Jan. 16, 2023 for corresponding Japanese application Serial No. 2020-565024, 4 pages.

* cited by examiner

REINFORCED VACUUM SYSTEM COMPONENT

CROSS-REFERENCE OF RELATED APPLICATION

This application is a Section 371 National Stage Application of International Application No. PCT/GB2019/050365, filed Feb. 12, 2019, and published as WO 2019/155235 A1 on Aug. 15, 2019, the content of which is hereby incorporated by reference in its entirety and which claims priority of British Application No. 1802245.9, filed Feb. 12, 2018.

FIELD

The present invention relates to a vacuum system and in particular a vacuum system wherein one or more components thereof comprises a continuous fibre reinforced matrix material, more specifically rotor assemblies for vacuum pumps. The invention further relates to a rotor blade, methods of manufacturing vacuums systems and components thereof.

BACKGROUND

A turbomolecular pump generally comprises a rotor having a plurality of axially spaced, annular arrays of inclined rotor blades. The blades are regularly spaced within each array and extend radially outwards from a central shaft. A stator of the pump surrounds the rotor and comprises annular arrays of inclined stator blades which alternate in an axial direction with the arrays of rotor blades. Each adjacent pair of arrays of rotor and stator blades forms a stage of the turbomolecular pump. As the rotor rotates, the rotor blades impact incoming gas molecules and transfer the mechanical energy of the blades into gas molecule momentum, that is directed from the pump inlet through the stages towards the pump outlet.

It is common for the rotor of a turbomolecular pump to be manufactured as a single metallic structure, e.g. a titanium alloy, with the blades integral with the shaft.

There is, however, an ongoing need to across all types of vacuum pumps to increase rotor speeds and reduce running costs.

To date fundamental limitations associated with typical additive manufacturing methods have limited their applicability to vacuum pumps: in particular the strength and durability of the resulting part.

For example, Fused Filament Fabrication (FFF) results in a part exhibiting low strength. Whilst prepreg composite construction methods using a sheet-based approach to form a three-dimensional part are both time consuming and difficult to handle resulting in higher expenses. Further, bending such sheets around curves may cause the fibres to overlap, buckle, and/or distort resulting in undesirable soft spots in the resultant vacuum component.

There is therefore an ongoing need for new components and methods of manufacture, to reduce costs and increase running speeds.

The present invention seeks to address, at least to an extent, these and other problems with the prior art.

The discussion above is merely provided for general background information and is not intended to be used as an aid in determining the scope of the claimed subject matter. The claimed subject matter is not limited to implementations that solve any or all disadvantages noted in the background.

SUMMARY

Accordingly, in a first aspect the invention provides a rotor assembly for a vacuum pump, the rotor assembly comprising a hub and one or more rotor blade arrays each comprising at least one rotor blade extending from a rotor blade root contiguous with the hub to a rotor blade tip. The rotor blade comprises a continuous fibre reinforced matrix material and includes a continuous fibre that extends from said rotor blade to a portion of the hub immediately adjacent said rotor blade.

Rotor assemblies according to the invention may be made lighter and run faster and cheaper than known rotor assemblies. In some instances, reducing or removing the need for cut-outs, hollows, and other weight-saving strategies.

Typically, the rotor assembly comprises a plurality of rotor blade arrays. The rotor blade arrays may comprise one or more rotor blades, typically two or more. Where the assembly comprises more than one array and/or the array comprises more than one rotor blade, typically every rotor blade includes a continuous fibre that extends from said rotor blade to a portion of the hub immediately adjacent said rotor blade.

The hub may be substantially annular with the rotor blades extend radially therefrom.

The hub may be integrally formed with a rotor shaft of the vacuum pump. Alternatively, a series of rotor assemblies may be arranged in sequence and adjacent hubs coupled together to form a rotor shaft.

In embodiments, a continuous fibre may extend from the rotor blade to the rotor shaft.

Preferably, the type and/or lay-up of the reinforcing continuous fibre varies between the rotor blade root and rotor blade tip. Typically, the type and/or lay-up of the continuous fibre is different at the rotor blade root to at the rotor blade tip.

The rotor assembly may be for a turbomolecular pump, and comprise an annular hub and one or more substantially annular rotor blade arrays each comprising a plurality of substantially identical rotor blades each extending radially from a rotor blade root contiguous with the hub to a rotor blade tip, wherein each rotor blade comprises a continuous fibre reinforced matrix material and includes a continuous fibre that extends from said rotor blade to a portion of the hub immediately adjacent said rotor blade.

The rotor assembly may also be a Roots rotor assembly. The Roots rotor assembly may comprise a plurality of rotor arrays in the form of a series of stages. Typically, each Roots rotor stage comprises from 2 to 5 rotor blades, also referred to as lobes, extending radially from a rotor blade root contiguous with the hub to rotor blade tip. The hub may be separate from or integrally formed with a rotor shaft. Alternatively, the hubs of adjacent stages may be joined to form a rotor shaft. Each rotor blade comprises a continuous fibre reinforced matrix material and includes a continuous fibre that extends from said rotor blade (or lobe) to a portion of the hub immediately adjacent said rotor blade. Suitable Roots vacuum rotor assemblies for employing the invention are disclosed in WO2007015056 (A1), which is incorporated herein by reference.

The rotor assembly may be a Northey (or claw) rotor assembly. The Northey rotor assembly may comprise a plurality of rotor arrays in the form of a series of stages. Typically, each Northey rotor stage comprises a single rotor blade, also referred to as a claw, extending radially from a rotor blade (or claw) root contiguous with the hub to a rotor blade (or claw) tip. The hub may be separate from or integrally formed with a rotor shaft. Alternatively, the hubs of adjacent stages may be joined to form a rotor shaft. Each rotor blade comprises a continuous fibre reinforced matrix material and includes a continuous fibre that extends from said rotor blade (claw) to a portion of the hub immediately adjacent said rotor blade. Suitable Northey vacuum rotor assemblies for employing the invention are disclosed in WO2008129317 (A1), which is incorporated herein by reference.

A rotor assembly according to the invention may comprise both one or more Northey rotor arrays and one or more Roots rotor arrays.

Alternatively, the rotor assembly may be a rotor assembly for a screw pump. The rotor assembly comprising an array externally threaded rotor blades in the form of a series of stages. Typically, each screw pump rotor stage comprises a single rotor blade extending from a hub. The rotors may be tapered. Typically, the pitch of the threads may increase progressively from a fluid inlet to a fluid outlet of the pump. The hub may be separate from or integrally formed with a rotor shaft. Alternatively, the hubs of adjacent stages may be interlocked to form a rotor shaft. Each rotor blade comprises a continuous fibre reinforced matrix material and includes a continuous fibre that extends from said rotor blade to a portion of the hub immediately adjacent said rotor blade. Suitable screw pump rotor assemblies for employing the invention are disclosed in WO2007068973 (A1), which is incorporated herein by reference.

Alternatively, the rotor assembly may be for a drag pump, such as a Siegbahn pumping mechanism. Each rotor may comprise a planar, disc-like rotor blade extending outwardly from a hub in form of a drive shaft. Each rotor blade comprises a continuous fibre reinforced matrix material and includes a continuous fibre that extends from said rotor blade to a portion of the hub immediately adjacent said rotor blade. Suitable Siegbahn rotor assemblies for employing the invention are disclosed in WO2008035112 (A1), which is incorporated herein by reference.

In embodiments, the rotor blade root and/or the rotor blade tip have a higher tensile strength and/or a higher flexural strength and/or creep resistance and/or elastic strain control than the remainder of the rotor blade body.

Additionally, or alternatively, the hub and rotor blades may each comprise substantially similar or the same matrix material and wherein each rotor blade comprises a continuous fibre that extends from said rotor blade to a portion of the hub immediately adjacent said rotor blade.

Preferably, the continuous fibre reinforced matrix material comprises a fused filament matrix. Preferably, the continuous fibre reinforced matrix material comprises fused composite filaments and a fused filament matrix. Preferably, the composite filaments and matrix filaments are printed. For the avoidance of doubt, the composite filaments and/or fused filaments may be as described elsewhere in this application.

In embodiments of the invention, each rotor blade may comprise a lattice core, typically an additive manufactured lattice core, preferably a 3D-printed lattice core.

The invention further includes drag pumps, turbomolecular pumps, screw pumps, and mechanical pumps including Roots and/or Northey rotor arrays.

In a further aspect the invention provides a method of manufacturing a rotor blade assembly of a vacuum pump, each rotor blade assembly comprising at least one rotor blade extending from a rotor blade root contagious with a hub to a root blade tip, the rotor blade comprising a continuous fibre reinforced matrix material, and the method comprising the steps of fusing continuous composite filaments and matrix filaments to form the rotor blade and wherein at least one reinforcing continuous fibre of each rotor blade is positioned to extend from the rotor blade to a portion of the hub immediately adjacent the rotor blade root. The rotor assembly so manufactured may be according to the previous aspect.

In another aspect the invention provides, a vacuum system comprising a component with a unitary structure comprising a continuous fibre reinforced matrix material, wherein the type and/or lay-up of the reinforcing continuous fibre within a first portion of the component is different to that in a second portion of the component. Typically, the lay-up and/or type of the reinforcing continuous fibre is such that at least one mechanical property of the first portion is different to that of the second portion.

The component may further comprise a third portion wherein the type and/or lay-up of the reinforcing continuous fibre of the third portion is different to the second portion and first portions of the same component, preferably such that at least one mechanical property of the third portion of the individual component is different to that of both the first and second portions of the same component.

The component may, in use, be a moving part of the vacuum system, e.g. a rotor blade. Typically, the component is additive manufactured.

Typically, an individual portion (e.g. a first portion and/or second portion and/or third portion) contains a single continuous fibre. An individual portion may be defined by a distinct section of the component reinforced by a single continuous fibre. Alternatively, a single component may contain a single continuous fibre. Thus, in embodiments a continuous fibre may reinforce the first portion, second portion and optional third portion.

Continuous fibres are distinct from chopped fibres, which typically have a length of from 0.2 mm to 10 mm. Typically, a continuous fibre within a component according to the invention will have a length of at least 0.5 m, preferably from about 1 m to about 50 m. The exact length will depend upon the size of the component and specific lay-up of the continuous fibre within the component. Typically, the continuous fibre will have a width and/or diameter of from about 0.5 mm to about 1.2 mm, preferably from about 0.8 mm to about 1 mm. Where the fibre is a composite filament the pre-wetting material may increase the radius of the fibre by, for instance, for instance surrounding the reinforcing continuous fibre in a plastic shell. Composite filaments may therefore have a radius that is from about 0.5 mm to about 1.5 mm, preferably about 1 mm, greater.

It may be desirable to include a cutting mechanism with any three-dimensional printing system used to manufacture the present components. Such a cutting mechanism may be used to provide selective termination in order to deposit a desired length of material. Otherwise, when employed, the printing process could not be easily terminated due to the deposited material still being connected to the material within the deposition head, for example, a continuous core.

The first portion may be at and/or immediately adjacent an edge of a component, such as extending along peripheral edge of a component, or at an intersection between a first surface and a second surface of the same component. When located at an intersection, the first portion may traverse the intersection.

The second portion may be at an alternative edge and/or an alternative intersection on the same component. Alternatively, the second portion may be a body section of the component extending between an edge, e.g. a peripheral edge, and an intersection.

Typically, the component is a moving part and the first portion is, in use, a relatively high stress portion of the component and the second portion is a relatively low stress portion of the component. The third portion may be a relatively intermediate stress portion of the same component, or alternatively, a relatively still higher stress or still lower stress portion of the same component.

In embodiments, the first portion is located at a peripheral edge of the component.

The first portion and second portion may be contiguous or separate. Similarly, the third portion may be contiguous with either the first and/or second portion, or separate from either the first and/or second portion.

For the purpose of the invention, the type of reinforcing fibre may refer to the geometry of the fibre, e.g. the shape and/or size of a cross-section of a fibre. Additionally, or alternatively, the type of reinforcing fibre may refer to the material from which the fibre is made, e.g. polymer fibre, carbon fibre, metallic fibre, or glass fibre. The individual component may therefore have a first portion comprising a continuous fibre comprising a first material and a second portion comprising a continuous fibre comprising a second material, and, optionally a third portion comprising a continuous fibre comprising a third material, each of the first, second and third materials being different to each other.

For the purpose of the invention, the lay-up of the reinforcing continuous fibre refers to the position of the fibre within the matrix and may variously refer to the fibre direction and/or fibre density and/or fibre pattern. The fibre density and/or direction and/or fibre pattern may therefore be different in the first portion of the component compared to the fibre density and/or direction and/or pattern in a second portion of the same component. The first portion of the component may have a higher fibre density than the second portion. In embodiments, the second portion may be substantially free from continuous fibre reinforcement. Additionally, or alternatively, there may be a plurality of portions having a first lay-up and a plurality of portions having a second lay-up within an individual component. An individual component may also comprise one or more areas having a third or further lay-ups. Typically, the fibre density will be highest in the volume the component determined to experience the highest stress during use.

The continuous fibre reinforcement may be placed within predetermined areas of a component to enhance its mechanical properties, e.g. strength, stiffness, creep resistance, high temperature stability and fatigue resistance. Strategic positioning and layering of the fibre reduces cost, weight and material usage compared to traditional composites or the base polymer.

Typically, the fatigue life of a rotor blade will be sufficient to prevent fatigue failure during the life of the product. Preferably the fatigue life will be greater than 20,000 fatigue cycles, each cycle comprising ramping the vacuum pump from zero to full speed and back.

Typically, the creep resistance of a rotor blade is such that an impeller can be run for 10 years and not creep by more than 0.5 mm. Preferably, the such creep resistance must be achieved at a rotor temperature of 100° C. or greater.

A rotor blade will preferably be stable at a predetermined operating temperature. Typically, the operating temperature is from about 100° C. to about 150° C., although higher and lower operating temperatures are foreseen.

Preferably, the continuous fibre reinforced matrix material comprises printed composite filaments. A composite filament is understood to be a continuous reinforcing fibre comprising a continuous reinforcing core wetted or pre-embedded with a matrix material or matrix binding material. The reinforcing core may be a continuous solid core or comprise a continuous multistrand core. The composite filament may be a continuous carbon fibre, pre-embedded in a thermoplastic polymer.

Preferably, the continuous fibre reinforced matrix material comprises a fused filament matrix. A fused filament matrix understood to be a matrix manufactured using fused filament fabrication. That is to say, an additive manufacturing method in which a supply of continuous filament, e.g. thermoplastic polymer, is fed through a heated printer extruder head, melted, and molten material is deposited on a work surface or the growing component. The head and worksurface are moved relative to one another to define the printed shape. Usually the head moves in layers, moving in two dimensions to deposit one horizontal plane at a time, before moving slightly upwards to begin a new slice. The speed of the extruder head may also be controlled, to stop and start deposition and form an interrupted plane.

Accordingly, in a second aspect the invention provides a vacuum system wherein one or more components thereof comprises a continuous fibre reinforced matrix material, wherein the continuous fibre reinforced matrix material comprises fused composite filaments and a fused filament matrix. Typically, the composite filaments and matrix filaments are printed.

As in earlier and later disclosed aspects of the invention, the type and/or lay-up of the reinforcing continuous fibre of a first portion of an individual component is different to a second portion the same component, preferably such that at least one mechanical property of the first portion of the individual component is different to that of the second portion of the same component.

In all aspects where a continuous composite filament is employed, appropriate continuous core fibre or strands include those materials which impart a desired property, such as structural, conductive (electrically and/or thermally), insulative (electrically and/or thermally), optical and/or fluidic transport. Such materials include, but are not limited to, carbon fibres, aramid fibres, glass fibres, metals (such as copper, silver, gold, tin, steel), optical fibres, and flexible tubes. Further, multiple types of continuous cores may be used in a single continuous core reinforced filament to provide multiple functionalities such as both electrical and optical properties. It should also be understood that a single material may be used to provide multiple properties for the core reinforced filament. For example, a steel core might be used to provide both structural properties as well as electrical conductivity properties.

Advantageously, the ability to introduce electrically conductive, optically conductive, and/or fluidly conductive cores within an individual component enables the construction of functional components in the structure, in addition to differential mechanical properties. For example, electrically conductive and optically conductive continuous cores may be used to construct strain gauges, optical sensors, wiring, and other appropriate components. Fluid conducting cores might also be used for forming components such as fluid channels and heat exchangers.

The continuous matrix fibre may also be provided in a variety of sizes. For example, a continuous matrix fibre may have an outer diameter that is greater than or equal to about 0.025 mm and less than or equal to about 10 mm. In one specific embodiment, the matrix fibre than or equal to about 0.25 mm and less than or equal to about 1 mm. In some embodiments, it is also desirable that the core reinforced filament includes a substantially constant outer diameter along its length.

Additionally, or alternatively, the matrix material may be a polymer matrix or a metallic matrix.

In embodiments where the matrix is a polymer matrix, the polymer may selected from the group consisting of a thermoset, a thermoplastic, an elastomer, and combinations thereof. For example, appropriate resins and polymers include, but are not limited to, acrylonitrile butadiene styrene (ABS), epoxy, vinyl, nylon, polyetherimide (PEI), Polyether ether ketone (PEEK), Polyactic Acid (PLA), Liquid Crystal Polymer, and various other thermoplastics. The core may also be selected to provide any desired property.

In embodiments where the matrix is a metal matrix, the matrix may contain a material selected from the group consisting of aluminium, stainless steel, titanium, nickel, and alloys thereof; including aluminium magnesium scandium alloys.

In embodiments, the component is a rotor blade or a substantially annular array of rotor blades. Typically, wherein the first portion includes a peripheral edge of a rotor blade and/or wherein the second portion includes a generally central portion of the same rotor blade.

Accordingly, in a further aspect the invention provides a rotor assembly for a turbomolecular pump, the rotor assembly comprising an annular hub and one or more substantially annular rotor blade arrays each comprising a plurality of substantially identical rotor blades each extending radially from a rotor blade root contiguous with the hub to a rotor blade tip, wherein each rotor blade comprises a lattice core, typically an additive manufactured, e.g. 3D printed, lattice core.

In this and previous aspects, the lattice core may have a closed or open cellular structure. Thus, the lattice core may comprise a continuous or discontinuous pore space.

The lattice core may be of a stochastic or periodic structure. Periodic structures typically have significantly higher strengths than stochastic structures. The skilled person will select a lattice structure depending upon the requirements of a specific rotor blade. Periodic lattice structures useful in the present invention include cubic, octet truss, and hexagonal lattice structures.

The lattice structures employed may be uniform or gradient. In uniform lattice structures, the size and dimensions of each elementary structure are constant throughout the whole part. In gradient lattice structures, the dimensions of each elementary lattice structure and the section of the trusses vary throughout the part. A gradient lattice structure may be employed to vary the density of the part. Thus, with the same material, a lattice with higher density will have higher strength and stiffness but will add more mass. By locally optimizing the properties of the structure, it is possible to tailor performance within a component to a specific application.

Additionally, or alternatively, the lattice structures may be conformal, i.e. orientated in accordance with the form and direction of the component's surface, or non-conformal, i.e. independent of the form of the component's surface.

Normally, the lattice core will itself be fully enclosed, such that it is not visible from outside the rotor blade. Typically, an outer sheet fully encloses the lattice core. Typically, the sheet and one or more trusses forming the lattice are continuous. Preferably, the sheet and one or more trusses forming the lattice are in the form of a unitary structure.

Employing a lattice structure in each rotor advantageously reduces the mass of the structure, whilst the precise lattice geometry and/or continuous fibre placement may be utilised to achieve a desired mechanical performance.

Typically, each rotor is a single unitary structure. Preferably each rotor blade assembly is in the form of a single unitary structure.

The rotor assembly may comprise a continuous fibre reinforced matrix material as discussed in other aspects of the invention.

In a further aspect the invention provides a method of manufacturing a component of a vacuum system comprising a continuous fibre reinforced matrix material, the method comprising the steps of fusing continuous composite filaments and matrix filaments to form the component such that the type and/or lay-up of reinforcing continuous fibre of a first portion of an individual component is different to a second portion the same component such that at least one mechanical property of the first portion of said individual component is different to that of the second portion of the same component.

A method manufacturing a rotor blade assembly of a vacuum system comprising the step of supplying a continuous reinforcing filament and a matrix material to a print head configured to receive the reinforcing filament and matrix material; heating the reinforcing filament and matrix material in at least one nozzle as the reinforcing filament and matrix material are translated out of the at least one nozzle; depositing heated reinforcing filament and matrix on a print bed; moving the print bed and/or the print head relative to the other to form the rotor blade assembly.

Preferably, the continuous reinforcing filament supplied to the print head is the form of a composite filament comprising a continuous reinforcing core pre-embedded in polymer, typically a thermoplastic polymer. Preferably, a separate thermoplastic filament is supplied to the print head. Typically, the thermoplastic filament comprises the same or a different polymer to the composite filament.

As in other aspects, the continuous fibre may be selected from the group consisting of carbon fibre, glass fibre, aramid fibre, metallic fibre, or others described herein, and/or combinations thereof.

In a further aspect the invention provides, method of designing a rotor blade assembly of a vacuum system comprising the steps of identifying differential mechanical property requirements of portions of the rotor blade assembly when in use; selecting a lay-up for providing the identified differential mechanical property requirements for the component using a continuous filament reinforced matrix material; and manufacturing the rotor blade assembly with the selected lay-up using an additive manufacturing technique, preferably composite filament fabrication. The varying mechanical property requirements may be identified using finite element analysis.

The Summary is provided to introduce a selection of concepts in a simplified form that are further described in the Detail Description. This summary is not intended to identify key features or essential features of the claimed subject matter, nor is it intended to be used as an aid in determining the scope of the claimed subject matter.

BRIEF DESCRIPTION OF THE DRAWINGS

Preferred features of the present invention will now be described, by way of example, with reference to the accompanying drawings, in which.

DETAILED DESCRIPTION

The present invention provides a vacuum system comprising a component having a unitary structure comprising a continuous fibre reinforced matrix material, wherein the type and/or lay-up of the reinforcing continuous fibre within a first portion of the component is different to that in a second portion of the component such that the magnitude of at least one mechanical property of the first portion is different to that of the second portion.

Typically, in use, the component is a moving part of the vacuum system and the first portion has a higher stiffness and/or elastic modulus that the second portion. Additionally, or alternatively, the first portion may have a higher creep resistance than the second portion. Preferably, the component is a rotor blade. Typically, the first portion includes the blade root and the second portion includes the body of the rotor blade. Preferably, the blade root is stiffest and most creep resistant portion of the rotor blade.

As previously disclosed, the invention further provides a rotor assembly for a vacuum pump, the rotor assembly comprising a hub and one or more rotor blade arrays each comprising one or more rotor blades extending radially from a rotor blade root contiguous with the hub to a rotor blade tip, wherein each rotor blade comprises a continuous fibre reinforced matrix material and a continuous fibre that extends from each rotor blade to a portion of the hub immediately adjacent the rotor blade.

When running at full speed, the blade roots, such as those of a turbomolecular pump, are under very high stress. The centrifugal force on the blade is dependent upon the rotational speed, blade geometry, and blade mass. Typically, the blade geometry and rotational speed are fixed for a known performance.

The present invention enables lower density composite materials to be used in the manufacture of the blade; thereby reducing stress at the blade root, enabling faster rotational speeds, improved rotordynamic performance, and requiring less energy to reach full speed.

By stiffening the root of the turbo blade, the effect of creep is reduced because the region of highest stress is reinforced. The use of strategically placed stiffening fibres within the rotor blade can also assists in resisting torsional forces and keep the blade aligned, reducing blade twisting at high loads, which may change the blade shape and detrimentally affect performance.

Figure 1:
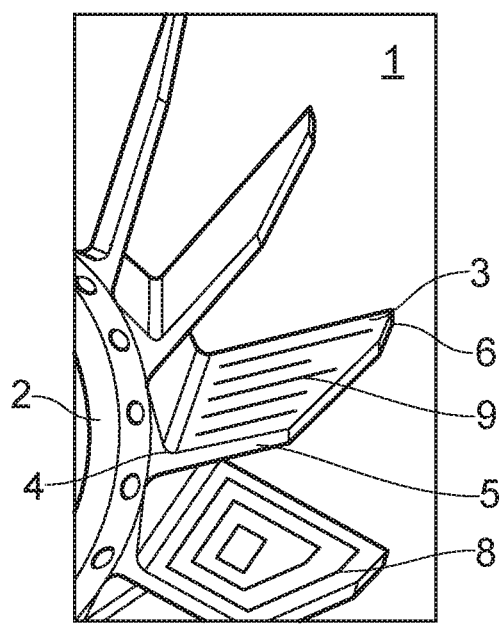
FIG. 1 shows a schematic representation of a rotor blade assembly according to the invention.

FIG. 1 shows an example of a rotor blade assembly (1) according to the invention and suitable for use in turbomolecular pumps manufactured by Edwards™. The assembly (1) comprises an annular hub (2) and an array of rotor blades (3) extending radially from the hub (2). The intersection (4) between each rotor blade (3) and the rotor hub (2) is referred to as a rotor blade root. The rotor blade edge (5) extends around the circumference of the rotor blade (3) and includes the rotor blade tip (6) at the radially outermost extremity of the rotor blade (3). The rotor blade body (7) extends in a substantially planar fashion from the rotor blade root (4) to the rotor blade tip (6). The exact geometry of the rotor blades (3) and the rotor blade assembly (1) will depend upon the specific nature of the pump involved.

The geometry of fibre layup is optimised for the application and/or within specific areas of the component and may be, for instance, cylindrical lay, helical, hatched, meshed, planar, tracked etc. Fibres may be internal or external. The rotor blades may have a continuous outer polymer or metallic surface, e.g. free from the continuous fibre, to provide a superior surface finish and/or to tailor performance and/or reduce outgassing.

In the exemplified rotor blades in FIG. 1, planar (8) and tracked (9) lay-ups of continuous fibre are schematically illustrated. The illustrated lay-ups provide resistance to torsional and radial stiffness respectively. The continuous fibre matrix may be continuous carbon fibre in a nylon matrix.

Figure 2:
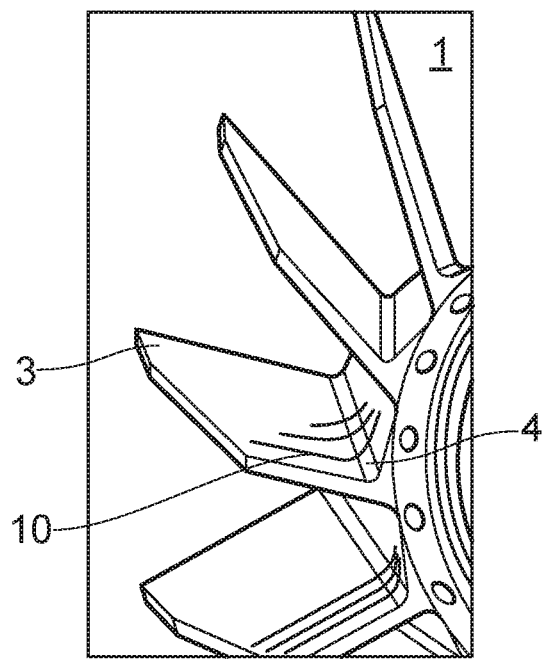
FIG. 2 shows a schematic representation of a rotor blade assembly according to the invention.

In FIG. 2 an additional arrangement is illustrated wherein the continuous fibre (10) traverses the blade root (4) of the rotor blade (3). This arrangement advantageously reduces creep in the root portion of the rotor assembly (1).

Figure 3:
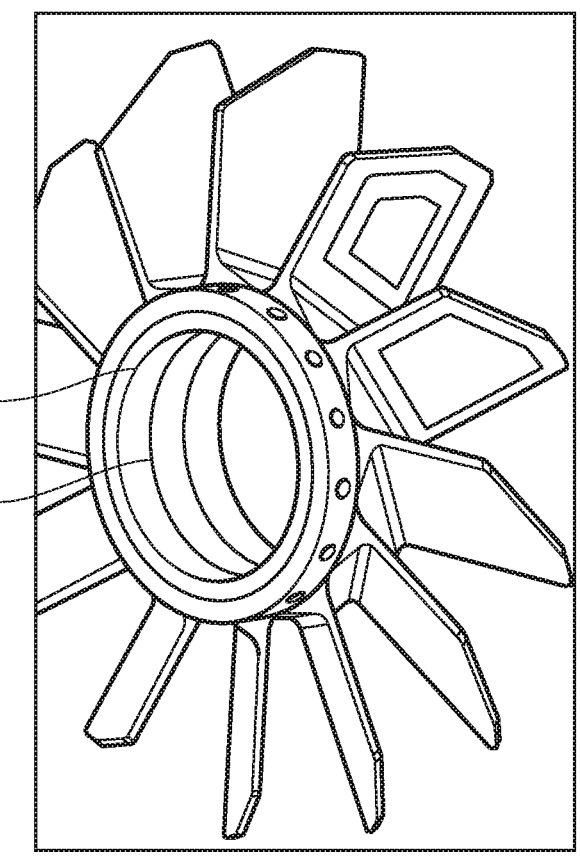
FIG. 3 shows a schematic representation of a rotor blade assembly according to the invention.

FIG. 3 illustrates a still further arrangement in which the annular rotor hub (2) is reinforced with a helically laid continuous fibre (11). This stiffens the hub and prevents deformation during use.

The components and rotor assemblies of the invention may be manufactured using a X7 carbon fibre printer manufactured by Markforged™.

It will be appreciated that various modifications may be made to the embodiments shown without departing from the spirit and scope of the invention as defined by the accompanying claims as interpreted under patent law.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are described as example forms of implementing the claims.

What is claimed:

1. A rotor assembly for a vacuum pump, the rotor assembly comprising a hub and one or more rotor blade arrays each comprising at least one rotor blade extending from a rotor blade root contiguous with the hub to a rotor blade tip, wherein the rotor blade comprises a plurality of printed planar layers wherein at least one of the printed planar layers comprises a planar continuous fibre layer comprising a continuous fibre having a length of at least 0.5 meters that extends from said rotor blade to a portion of the hub immediately adjacent said rotor blade within a plane.

2. The rotor assembly according to claim 1, wherein the plurality of printed planar layers further comprises a printed polymer matrix layer.

3. The rotor assembly according to claim 1, comprising a plurality of rotor blade arrays.

4. The rotor assembly according to claim 1, wherein the rotor blade root and/or the rotor blade tip have a higher tensile strength and/or a higher flexural strength and/or higher creep resistance than the remainder of the blade.

5. The rotor assembly according to claim 1, wherein at least one of the plurality of printed planar layers forms part of the hub.

6. The rotor assembly according to claim 1, wherein the planar continuous fibre layer is formed of fused filaments.

7. The rotor assembly according to claim 1, wherein the planar continuous fibre layer is formed of fused composite filaments and is fused to a planar layer of fused filaments.

8. The rotor assembly according to claim 7, wherein the planar layer of fused filaments is printed.

9. The rotor assembly according to claim 1, wherein the continuous fibre is selected from the group consisting of carbon fibre, glass fibre, aramid fibre, metallic fibre, and/or combinations thereof.

10. The rotor assembly according to claim 1, wherein at least one of the plurality of planar layers comprises a metallic matrix.

11. The rotor assembly according to claim 1, wherein at least one of the plurality of planar layers comprises a polymer matrix and the polymer is selected from the group consisting of a thermoset, a thermoplastic, an elastomer, and combinations thereof.

12. The rotor assembly according to claim 1, wherein each rotor blade comprises a lattice core.

13. The rotor assembly according to claim 12, wherein an outer sheet fully encloses the lattice core.

14. The rotor assembly according to claim 13, wherein the sheet and lattice core are a unitary structure.

15. A method of manufacturing a rotor blade assembly of a vacuum pump, each rotor blade assembly comprising at least one rotor blade extending from a rotor blade root contiguous with a hub to a rotor blade tip, the method comprising the steps of fusing a continuous composite filament to form a planar layer containing a continuous fibre and fusing a matrix filament to form a planar layer of matrix material wherein the planar layer containing the continuous fibre defines a part of a rotor blade and a part of the hub such that the continuous fibre extends from the rotor blade to a portion of the hub immediately adjacent the rotor blade root.

* * * * *